(12) United States Patent
Greenslade et al.

(10) Patent No.: US 9,544,349 B2
(45) Date of Patent: *Jan. 10, 2017

(54) MULTICAST MEDIA NOTIFICATION FOR QUEUED CALLS

(71) Applicant: Cisco Technology, Inc., San Jose, CA (US)

(72) Inventors: Thomas D. Greenslade, Berkshire (GB); Guy C. Leaver, Berkshire (GB); Murlin H. Coffey, III, Purcellville, VA (US); Ian D. Hughes, Slough (GB); Jason Cresswell, Buckinghamshire (GB)

(73) Assignee: Cisco Technology, Inc., San Jose, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/625,890

(22) Filed: Feb. 19, 2015

(65) Prior Publication Data

US 2015/0163276 A1 Jun. 11, 2015

Related U.S. Application Data

(63) Continuation of application No. 13/525,538, filed on Jun. 18, 2012, now Pat. No. 8,995,307.

(51) Int. Cl.
| | |
|---|---|
| *H04L 12/16* | (2006.01) |
| *H04L 29/06* | (2006.01) |
| *H04L 12/18* | (2006.01) |
| *H04N 7/15* | (2006.01) |

(52) U.S. Cl.
CPC ......... *H04L 65/605* (2013.01); *H04L 12/1881* (2013.01); *H04L 65/1089* (2013.01); *H04N 7/15* (2013.01)

(58) Field of Classification Search
USPC ............... 348/14.01–14.16; 370/259–271, 370/351–357; 709/201–207, 217–248
See application file for complete search history.

(56) References Cited

U.S. PATENT DOCUMENTS

| | | |
|---|---|---|
| 7,082,142 B1 | 7/2006 | Begeja |
| 7,209,475 B1 | 4/2007 | Shaffer et al. |
| 7,333,496 B1 | 2/2008 | Patel et al. |
| 7,631,080 B2 | 12/2009 | Epstein et al. |

(Continued)

OTHER PUBLICATIONS

International Search Report and Written Opinion in International Application No. PCT/US2013/041499, mailed Jul. 24, 2013.

*Primary Examiner* — Hemant Patel
(74) *Attorney, Agent, or Firm* — Edell, Shapiro & Finnan, LLC (57) ABSTRACT

Multicast media notifications are provided when unicast media encoders are unavailable to serve endpoints that send a communication session request to a call control device. When the call control device receives a communication session request from an endpoint, a determination is made as to whether any one of a plurality of unicast media encoders is available for the communication session request. When it is determined that none of the plurality of unicast media encoders is available, the endpoint is connected to a multicast media encoder that presents a multicast media notification to the endpoint. The multicast media encoder generates a video keyframe associated with the multicast media notification, synchronizes the video keyframe to a starting point of audio, and outputs the synchronized video keyframe.

20 Claims, 9 Drawing Sheets

(56) References Cited

U.S. PATENT DOCUMENTS

| | | |
|---|---|---|
| 7,907,718 B2 | 3/2011 | Sin et al. |
| 7,929,012 B2 | 4/2011 | Fry et al. |
| 8,453,148 B1 | 5/2013 | Hobbs |
| 8,503,538 B2 * | 8/2013 | Dei et al. ................. 375/240.26 |
| 8,995,307 B2 * | 3/2015 | Greenslade et al. .......... 370/265 |
| 2003/0225845 A1 | 12/2003 | Hong |
| 2005/0259584 A1 | 11/2005 | Chen et al. |
| 2006/0200574 A1 | 9/2006 | Pickens et al. |
| 2007/0147411 A1 | 6/2007 | Bijwaard et al. |
| 2007/0168523 A1 | 7/2007 | Jiang et al. |
| 2007/0244982 A1 | 10/2007 | Scott et al. |
| 2009/0075685 A1 | 3/2009 | Beyer, Jr. |
| 2010/0169504 A1 | 7/2010 | Gabin et al. |
| 2011/0213887 A1 | 9/2011 | Hernanz |
| 2012/0013705 A1 | 1/2012 | Taylor et al. |

* cited by examiner

MULTICAST MEDIA NOTIFICATION FOR QUEUED CALLS

CROSS-REFERENCE TO RELATED APPLICATION

This application is a continuation of U.S. patent application Ser. No. 13/525,538, filed Jun. 18, 2012, the entirety of which is incorporated herein by reference.

TECHNICAL FIELD

The present disclosure relates to telecommunication systems.

BACKGROUND

In communication systems that allow a user (caller) to engage in a communication session with one or more other users (callers), a user at an endpoint connects into a call control unit that switches media streams sent from each endpoint to the other endpoint(s) participating in a communication session.

The call control unit may have an autoattendant/interactive voice response function that presents multimedia prompts to a caller/participant at an endpoint to enter the appropriate information so that the call control unit initiates a communication session or joins an endpoint in a communication session. The autoattendant function is provided by a plurality of encoder resources that can accommodate a finite number of endpoints at any given time. However, there are times when there are more communication session requests from endpoints than there are available encoder resources.

DESCRIPTION OF EXAMPLE EMBODIMENTS

Overview

Multicast media notifications are provided when unicast media encoders are unavailable to serve endpoints that send a communication session request to a call control device. When the call control device receives a communication session request from an endpoint, a determination is made as to whether any one of a plurality of unicast media encoders is available for the communication session request. When it is determined that none of the plurality of unicast media encoders is available, the endpoint is connected to a multicast media encoder that presents a multicast media notification to the endpoint. Also, the multicast media encoder generates a video keyframe associated with the multicast media notification, synchronizes the video keyframe to a starting point of an audio portion of the multicast media notification, and outputs the synchronized video keyframe.

Example Embodiments

Figure 1:
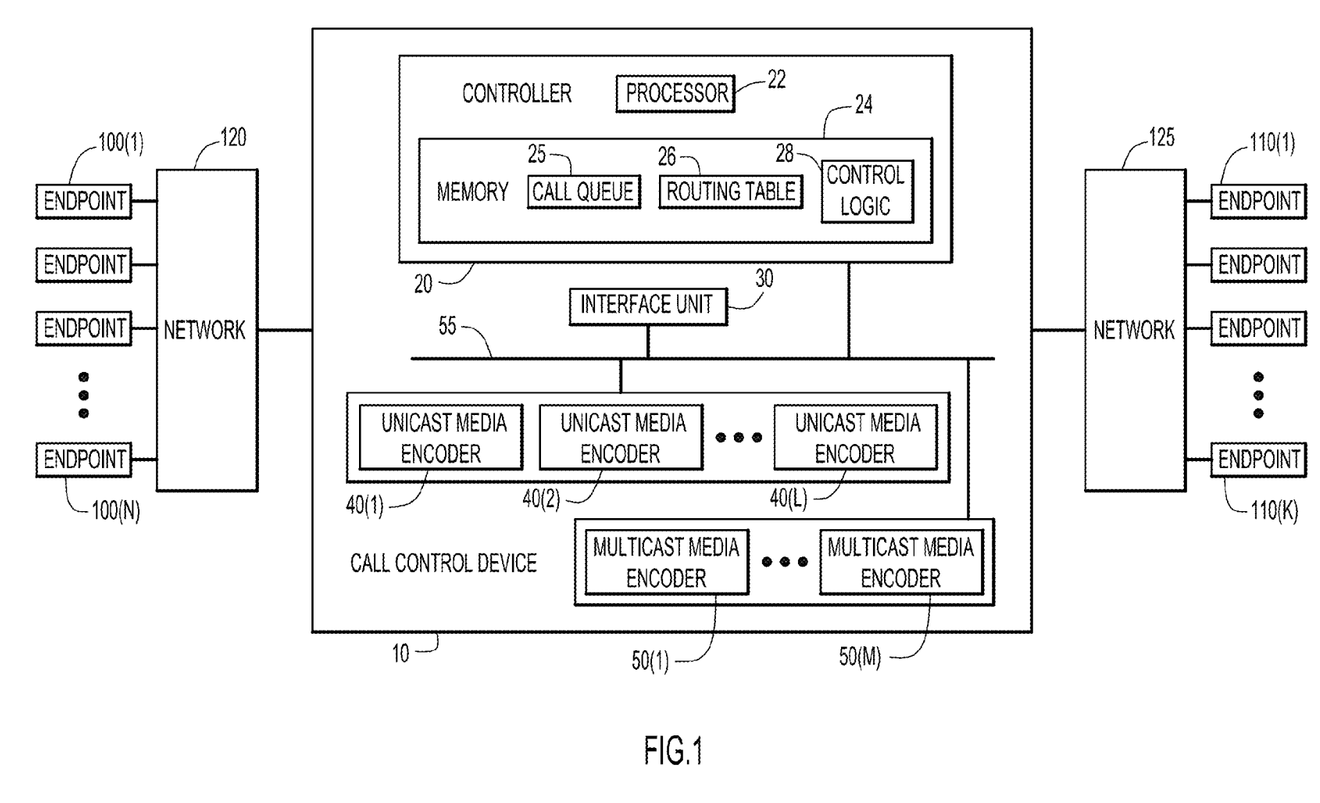
FIG. 1 is an example block diagram of a call control device configured to provide a multicast media notification to queued communication session requests.

Referring first to FIG. 1, a block diagram is shown of a call control device 10 that enables communication among a plurality of endpoints. Examples of endpoints are shown at reference numerals 100(1)-100(N) and 110(1)-110(K). The call control device 10 may be a conference bridge or multipoint control unit to coordinate video conferences, a gateway device to handle communication session requests between endpoints of different connectivity types, a switch-based conference unit, a conference bridge with transcoding functions, etc. In one non-limiting example, the call control device 10 is configured to serve as a gateway between endpoints that are configured to communicate in accordance with one network protocol type, e.g., the Integrated Services Digital Network (ISDN), and endpoints that are configured to communicate in accordance with another network protocol type, e.g., the Internet Protocol (IP). For example, the endpoints 100(1)-100(N) are ISDN endpoints and endpoints 110(1)-110(K) are IP endpoints. Again, this is only an example.

The call control device 10 comprises components to facilitate its communication session setup and maintenance functions, depending on its particular intended purpose, and also components to provide a multicast media notification for queued communication session requests. Many of the components that are associated with the communication session setup and maintenance functions are system-specific and are not related to the multicast media notification operations. Accordingly, the components for the call routing and communication session maintenance functions are not shown in FIG. 1 and are not described herein.

The term "communication session request" is meant to include a request or "call" placed by a user at an endpoint to initiate or join a communication session with one or more other endpoints. Thus the terms "call" and "communication session request" are used interchangeably herein.

To support the multicast media notification operations, the call control device 10 comprises a controller 20, an interface unit 30, a block of unicast media encoders 40(1)-40(L) and one or more multicast media encoders 50(1)-50(M). A bus 55 is provided for interconnectivity among the controller 20, interface unit 30, unicast media encoders 40(1)-40(L) and multicast media encoders 50(1)-50(M).

The controller 20 includes at least one processor 22, e.g., a microprocessor or a microcontroller, and a memory 24. The memory 24 may comprise one or more memory devices and is used to store instructions that are executed by the processor 22 and to store data used for operations performed by the controller 20. For example, the memory 24 includes memory space for a call queue 25 for which communication session requests from endpoints may be assigned depending on the status of the unicast media encoders 40(1)-40(L) and for a routing table 26 that stores data to assist in routing communication session requests between endpoints. In addition, the memory 24 stores instructions for control logic 28. The control logic 28 comprises software instructions that are executable by the processor 22 to perform the operations described hereinafter in connection with FIGS. 2-9.

The memory 24 may comprise read only memory (ROM), random access memory (RAM), magnetic disk storage media devices, optical storage media devices, flash memory devices, electrical, optical, or other physical/tangible memory storage devices. Thus, in general, the memory 24 may comprise one or more tangible (non-transitory) computer readable storage media (e.g., a memory device) encoded with software comprising computer executable instructions and when the software is executed (by the processor 22) it is operable to perform the operations described herein.

In another form, the operations of the controller 22 described hereinafter in connection with FIGS. 2-9 may be performed in hardware by digital logic gates appropriate configured, a programmable digital logic device, such as a field programmable gate array (FPGA) or other suitable hardware logic.

The interface unit 30 is a network interface card or collection of network interface cards configured to enable network communication with the endpoints 100(1)-100(N) and 110(1)-110(K). In the example in which the call control device 10 is configured to communicate with endpoints of different network connectivity types, the interface unit 30 is capable of communicating over a network 120 to communicate with endpoints 100(1)-100(N) and over a network 125 to communicate with endpoints 110(1)-110(K). However, as explained above, the call control device 10 may take on a variety of forms and the endpoints may all be of the same network connectivity type such that the network 120 is the same type as network 125. The endpoints 100(1)-100(N) and 110(1)-110(K) may be voice-over-IP (VoIP) phones (with or without video capability), Smartphones, laptop computers, desktop computers, softphones, conference endpoints, etc.

The unicast media encoders 40(1)-40(L) are each configured to provide a unicast media function to a single endpoint at any given time. In one example, each unicast media encoder 40(1)-40(L) may be configured to provide an autoattendant/interactive voice response (IVR) function to guide a user at an endpoint in establishing or joining a communication session with one or more other endpoints. There may be different groups of unicast media encoders that are configured to encode media according to different encoding formats. For example, the unicast media encoders may be configured to output a media notification "Enter the number you wish to call" as well as other prompts. The user at that endpoint enters the number or some other identifier of an endpoint to call, and the call control device 10 initiates the call to that endpoint. In general, the unicast media encoders are each configured to output unicast media to a single endpoint.

As mentioned above, in one example, the unicast media encoders 40(1)-40(L) are configured to provide an autoattendant/IVR capability to endpoints associated with communication session requests, i.e., in setting up, joining or tearing down a communication session. In this sense, the unicast media encoders 40(1)-40(L) are not involved in encoding or decoding of the communication session media generated by and transmitted between the endpoints. The call control device 10 forwards the communication session media to the endpoints involved in the communication session. In another example, the call control device 10 may perform transcoding operations with respect to the communication session media using the unicast media encoders 40(1)-40(L) for the transcoding operations. In other words, the unicast media encoders 40(1)-40(L) may be transcoders that are configured to transcode media associated with a communication session from one encoding format to another.

The multicast media encoders 50(1)-50(L) are each configured to output a multicast media notification to one or a plurality of endpoints. Each multicast media encoder 50(1)-50(L) may be configured to provide an abbreviated media notification, i.e., one that is much more limited (in time duration, complexity, resolution quality, etc.) than the media output by a unicast media encoder. In one form, the call control device 10 has a single multicast media encoder that is used to serve one or a plurality of endpoints each configured to operate in accordance with the same media encoding format. However, in order to accommodate endpoints that operate in accordance with different media encoding formats, a plurality of multicast media encoders are provided, each configured to output media in accordance with a corresponding one of a plurality of encoding formats. The call control device 10 can determine the decoding capabilities of an endpoint based on a priori knowledge about that endpoint or based on control signaling between the endpoint and the call control unit 10 prior to processing a communication session request received from the endpoint.

The term "media" as used herein is meant to include one or more of audio, video (still/static image frames or a sequence of image frames, such as a video clip), documents, etc. Thus, the multicast media notification generated and output by the multicast media encoder may comprise one or more of: an audio bitstream, a still video image frame and a video bitstream comprising a sequence of video frames, e.g., a video clip. A "media encoder" is meant to refer to a resource capable of producing a single media stream, and a "multicast media encoder" is a resource that produces a single media stream that is duplicated for output to each endpoint that is to receive that same media stream.

In one form, the unicast media encoders 40(1)-40(L) and the multicast media encoders 50(1)-50(K) may be implemented in hardware, e.g., by one or more digital signal processors or other application specific integrated circuit (ASIC) devices. In another form, unicast media encoders 40(1)-40(L) and the multicast media encoders 50(1)-50(K) may be implemented in software executed stored in memory 24 and executed by the processor(s) 22. In either case, each unicast media encoder 40(1)-40(L) is configured to output a media notification (bitstream) to a single endpoint at any given time, whereas each multicast media encoder 50(1)-50(K) is configured to output the same media notification or bitstream to one or multiple endpoints at any given time.

Briefly, the controller 20 is configured to determine whether any one of the plurality of unicast media encoders 40(1)-40(L) is available or free to serve a particular endpoint upon receiving a communication session request from the particular endpoint. For example, the communication session request may be a request to place a voice or video call to another endpoint or to join a video conference involving one or more other endpoints. When the controller 20 determines that none of the plurality of unicast media encoders is available at the time of the communication session request, it connects the particular endpoint to a multicast media encoder to present a multicast media notification to the particular endpoint.

Figure 2:
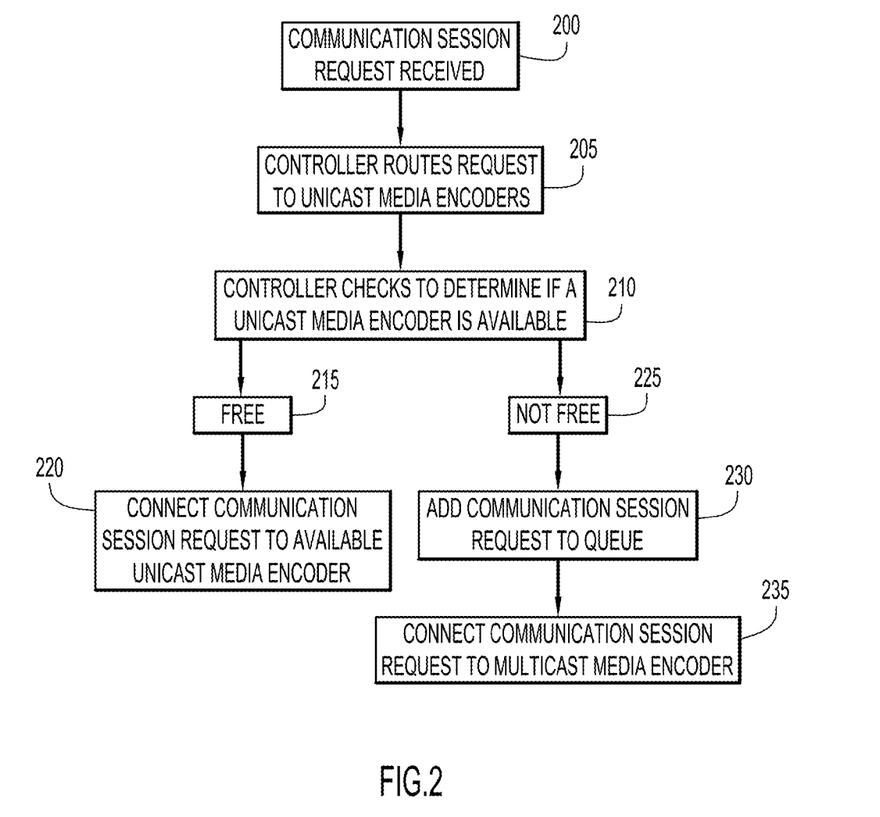
FIG. 2 is a flow chart depicting operations performed by the call control device to provide multicast media notification to queued communication session requests.

Reference is now made to FIG. 2, in conjunction with FIG. 1, for a description of a generalized operational flow of the call control device 10 in connection with the operation of the unicast media encoders 40(1)-40(L) and multicast media encoders 50(1)-50(K). At 200, the call control device 10 receives a communication session request from a particular endpoint. At 205, the controller 20 routes the communication session request to the unicast media encoders 40(1)-40(L). At 210, the controller 20 checks to determine if one of the unicast media encoders is available to serve the communication session request from the particular endpoint. In one example, the controller 20 determines whether there is an available unicast media controller that is configured to output encoded media of the format that the particular endpoint can decode. At 215, the controller determines that a unicast media encoder is free, and at 220, the controller connects the communication session from the particular endpoint to the free unicast media encoder.

On the other hand, at 225, when the controller 20 determines that none of the unicast media encoders is available (they are all busy serving other endpoints) or none is available of the encoding format that the particular endpoint can decode, then at 230, the controller 20 places the communication session request in the queue 25 for use of one of the plurality of unicast media encoders, and at 235, connects the communication session request from the particular endpoint to the multicast media encoder. The multicast media encoder will then output a multicast media notification or notification to the particular endpoint. While the flow chart of FIG. 2 has been described with respect to a communication session request received from a single endpoint, it should be understood that these operations are applicable to a situation when multiple communication session requests are received from corresponding endpoints, e.g., aggregation of multiple communication session requests.

The following summarizes the operations of the flow chart of FIG. 2. A communication session request is received at a call control device from an endpoint. It is determined whether any one of a plurality of unicast media encoders is available for the communication session request. A multicast media encoder is provided in the call control device, where the multicast media encoder is configured to present a multicast media notification. When it is determined that none of the plurality of unicast media encoders is available, the endpoint is connected to the multicast media encoder, and the multicast media notification is presented to the endpoint.

Figure 3:
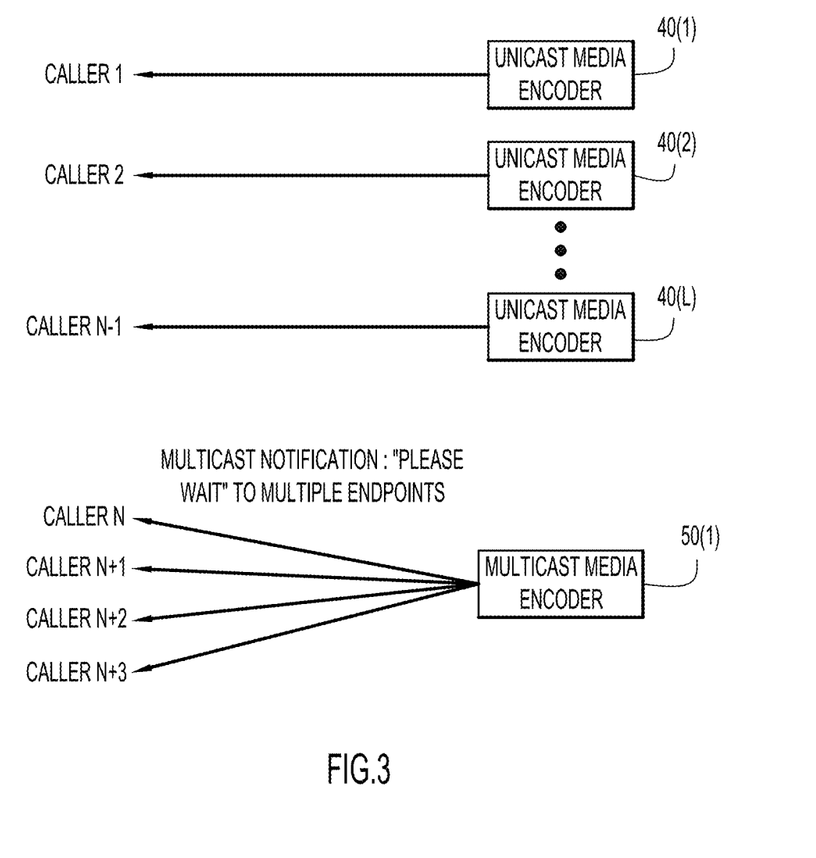
FIG. 3 is a diagram illustrating the use of a single multicast media encoder to provide a multicast media notification to endpoints associated with a plurality of queued communication session requests.

Reference is now made to FIG. 3 for a pictorial representation of the operations of FIG. 2. In the example of FIG. 3, there are a plurality of unicast media encoders 40(1)-40(L) serving callers 1 through N-1 (where L=N-1), where each caller may be considered an endpoint in this pictorial depiction. There is a single multicast media encoder 50(1) in this example. While all of the unicast media encoders 40(1)-40(L) are busy serving callers, a block of additional communication session requests are received from callers N to N+3 (not necessarily at the same time). Since none of the unicast media encoders are available to service any of the additional communication session requests from callers N to N+3, the communication session requests from these endpoints are connected to the multicast media encoder 50(1). The multicast media encoder 50(1) outputs a multicast media notification to each of the callers N to N+3. The multicast media notification may be as simple as an audio and/or video notification that says "Please Wait" as shown in FIG. 3.

In summary, FIG. 3 illustrates a scenario in which a plurality of communication session requests are received from a plurality of endpoints. It is determined that there are insufficient unicast media encoders available for two or more of the plurality of communication session requests. Two or more of the plurality of endpoints are connected to a multicast media encoder to present a multicast media notification or notification to the two or more of the plurality of endpoints.

Figure 4:
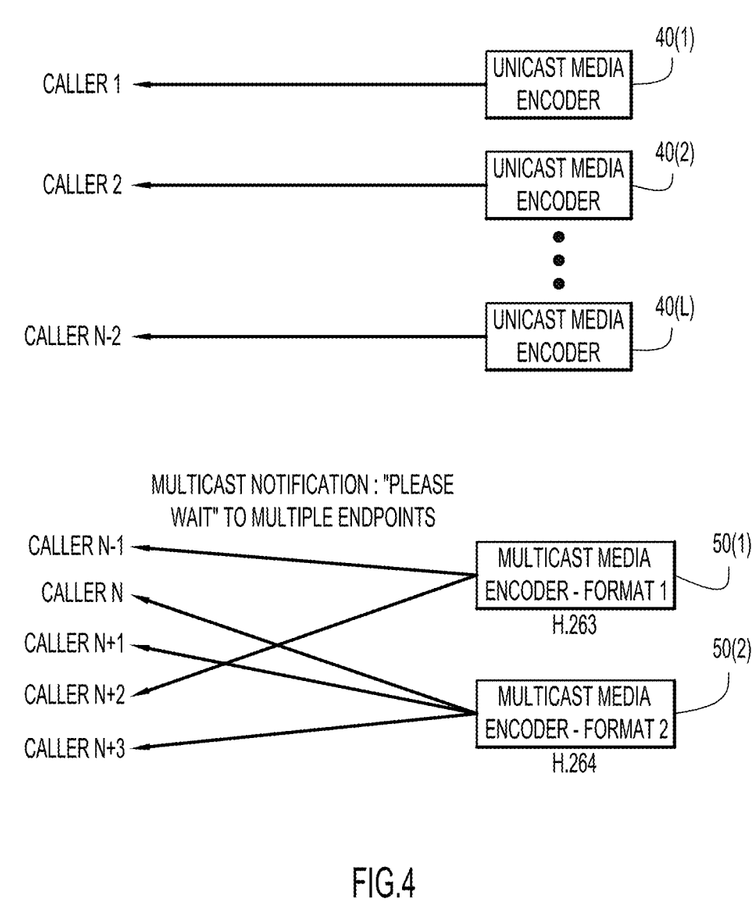
FIG. 4 is a diagram illustrating the use of multiple multicast media encoders, each configured to provide a multicast media notification according to a different media encoding format.

Reference is now made to FIG. 4, which shows an example pictorial diagram similar to FIG. 3, but with a plurality of multicast media encoders, each configured to output a multicast media notification encoded according to a different encoding format. For example, multicast media encoder 50(1) is configured to output media in accordance with a first format (Format 1), such as the H.263 video compression/encoding standard, and multicast media encoder 50(1) is configured to output media in accordance with a second format (Format 2), such as the H.264 video compression/encoding standard. There may be still further multicast media encoders, each configured to output media for other encoding formats/standards, but for simplicity only two multicast media encoders are shown in the example of FIG. 4.

In the example of FIG. 4, callers 1 to N-2 are served by unicast media encoders 40(1)-40(L) such that all of the unicast media encoders 40(1)-40(L) are busy. Communication session requests are received (not necessarily at the same time) from callers N-1 to N+3, and the endpoints from which these additional communication requests are not all capable of processing the same type of encoded media. For example, callers N-1 and N+2 are at endpoints that are capable of processing media encoded according to Format 1 (e.g., H.263) and callers N, N+1 and N+3 are at endpoints that are capable of processing media encoded according to Format 2 (e.g., H.264). Accordingly, the controller 20 in the call control device 10 connects the communication session requests from callers N-1 and N+2 to multicast media encoder 50(1) and connects the communication session requests from callers N, N+2 and N+3 to multicast media encoder 50(2).

FIG. 4 thus illustrates a scenario in which a plurality of communication session requests are received from a plurality of endpoints. It is determined that there are insufficient unicast media encoders available for the plurality of communication session requests, and different subsets of the plurality of endpoints that are configured to operate in accordance with different encoding formats are connected to corresponding ones of the plurality of multicast media encoders. In other words, an audio/video codec can be provided in the call control device 10 for each of the encoding formats that are expected to be encountered from endpoints.

Figure 5:
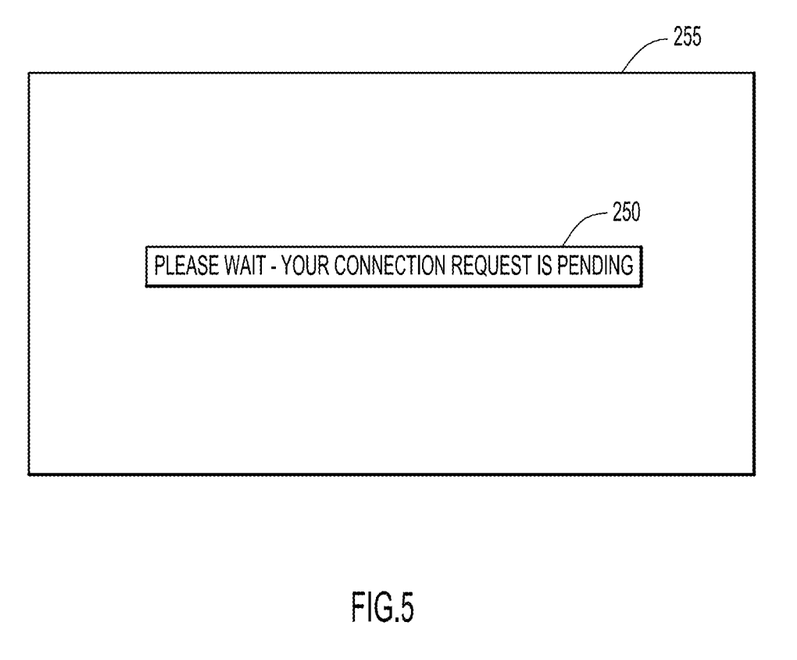
FIG. 5 is a diagram illustrating an example of a multicast media notification.

Turning now to FIG. 5, an example of a multicast media notification is shown at reference numeral 250, presented on a display screen 255. The multicast media notification 250 may comprise a simple text message that says "Please Wait" or even a longer text message "Please Wait—Your Connection Request is Pending" so that a user knows that the system is operating and to wait until the next stage in the communication session occurs. Audio may accompany the text message 250 that announces the words contained in the text message. In other examples, the multicast media notification 250 may be a still image frame (with or without accompanying audio), a video clip (with or without accompanying audio) or an audio clip/message only.

Figure 6:
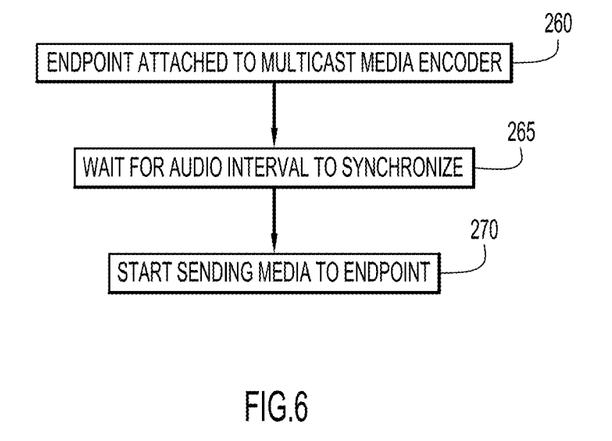
FIG. 6 is a flow chart depicting operations to synchronize output of the starting point of an audio portion of the multicast media notification to an endpoint.
Figure 7:
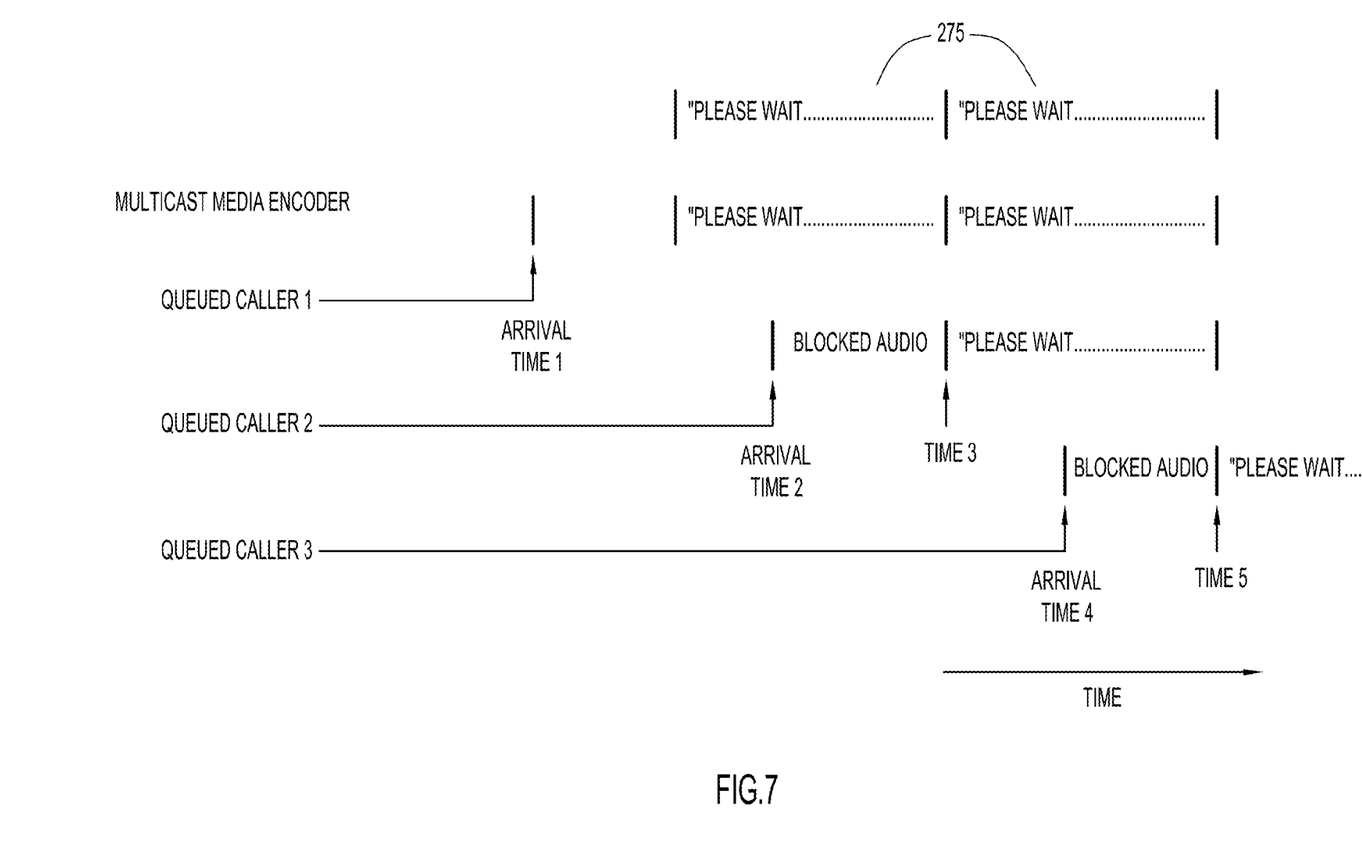
FIG. 7 is a diagram illustrating examples of synchronizing audio of the multicast media notification to endpoints.

Reference is now made to FIGS. 6 and 7. FIG. 6 illustrates a flow chart that depicts operations performed by the controller 20 in conjunction with a multicast media encoder in the call control device 10 to synchronize the output of audio of the multicast media notification supplied to an endpoint. In one form, the audio portion of the multicast media notification is output in a continuous repeating loop. As a result, it is desirable to synchronize the output of the audio to the endpoint with a starting point of the audio so that a user does not hear the audio at a mid-point of the audio portion (resulting in a partial or cut-off portion of the audio), which may not be understandable to the user. Thus, at operation 260, the controller 20 connects an endpoint to a multicast media encoder (according to the operations depicted in FIG. 2). At 265, the controller 20 blocks (delays) output of the audio for a period of time until the audio loop reaches it starting point. After that period of time, at 270, the controller 20 causes the audio to be output to the endpoint so that the endpoint receives the audio beginning at the starting point of the audio loop. A further variation may involve sending only one "Please wait" audio segment to each endpoint by blocking the output for the audio after the end of the first complete "Please wait". Still another variation is to keep each call in the queue until the entirety of the "Please wait" message has been played before connecting the call to an available unicast media encoder, to avoid cutting it off so that a user hears only "Ple . . . ".

FIG. 7 provides a pictorial representation of the operations of FIG. 6. In the example of FIG. 7, the audio output from the multicast media encoder contains an announcement of the words "Please wait" in a continuous repeating audio loop as shown at 275. A first caller, Caller 1 is received at Time 1 and Caller 1 has been added to the queue because all the unicast media encoders are busy. In this case, the communication session request from Caller 1 arrives shortly before the starting point of the audio loop 275. There is no need to delay the output of the audio loop 275 to Caller 1. Caller 2, however, arrives at Time 2, which is in the middle of the audio loop 275. As such, the output of the audio to Caller 2 is delayed as indicated in FIG. 7 by "Blocked Audio" for a period of time until Time 3, corresponding to the starting point of the audio loop 275. Similarly, Caller 3 arrives at Time 4, which is in the middle of the audio loop and therefore the output of the audio loop is delayed until Time 5, corresponding to the next starting point of the audio loop.

Figure 8:
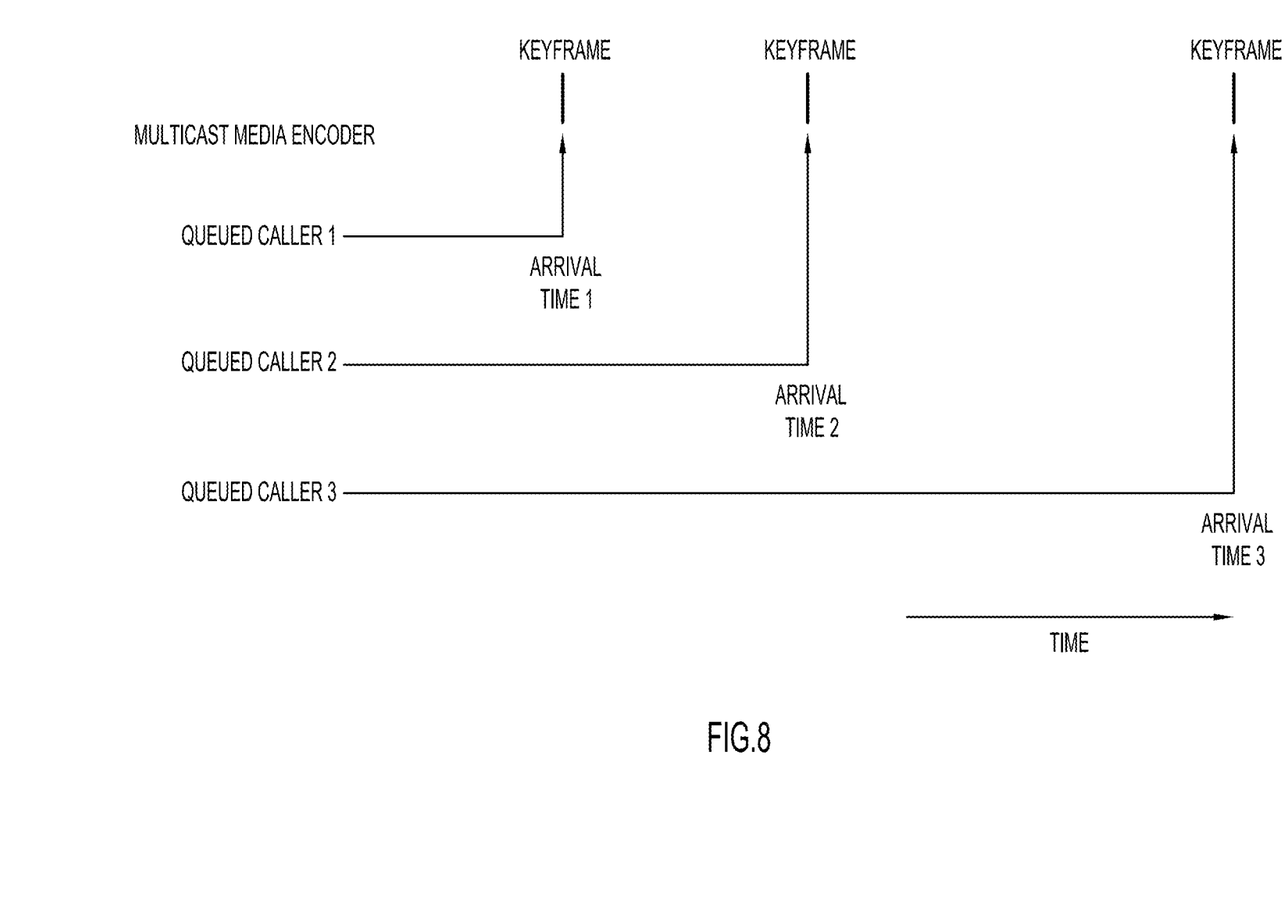
FIG. 8 is a diagram illustrating the timing for generation and output of a video keyframes from the multicast media encoder to endpoints.

Reference is now made to FIG. 8, which shows a technique for synchronizing output of a multicast media notification so that the video portion of the multicast media notification is properly decodable by an endpoint. Frames of a video stream are encoded, according to an encoding format, in such a matter that not every frame contains all of the encoded pixel content for that frame, but rather data representing differences from one or several prior frames. This enables less data to be transmitted. A video keyframe is, however, transmitted on a periodic or as needed basis. The video keyframe contains all of the encoded pixel content for a frame, so that an endpoint can reconstruct a complete video frame of video stream at a point in time. In one example, the keyframe is an Intra-frame (I-frame) according to the Moving Picture Experts Group (MPEG) standard. An I-frame can be decoded independently of any other frame.

When communication session requests are received at the call control device 10, if the current video frame for the multicast media notification is not a video keyframe, then the endpoint cannot decode and completely reconstruct the video stream at that point in time. Accordingly, the controller 20 controls the multicast media encoder to generate and output a video keyframe for the multicast media notification when a communication session request from an endpoint is placed in the call queue. Even if a video keyframe is not scheduled to be output by the multicast media encoder, the multicast media encoder will be controlled to output a video keyframe at the time an endpoint is added to the queue. Thus, for example, Caller 1 is placed in the queue at Time 1, and at that time, the controller 20 causes the multicast media encoder to output a keyframe so that the endpoint for Caller 1 can begin decoding and presenting the video portion of the multicast media notification. Similarly, when Caller 2 is placed in the queue at Time 2, the multicast media encoder is controlled to output a video keyframe at Time 2, and likewise, when Caller 2 is placed in the queue at Time 3, the multicast media encoder outputs a keyframe at time T3. In this way, an endpoint does not have to wait until the next keyframe is normally scheduled to be generated before presenting the video portion of the multicast media notification.

The concepts of FIGS. 7 and 8 may be combined such that the output of the keyframe for the video portion of a multicast media notification is synchronized to the starting point of the audio loop. Thus, the endpoint will receive encoded audio at the start of the audio loop and a keyframe at the same time to enable the endpoint to begin decoding the video frames of the multicast media notification for presentation to a user.

Figure 9:
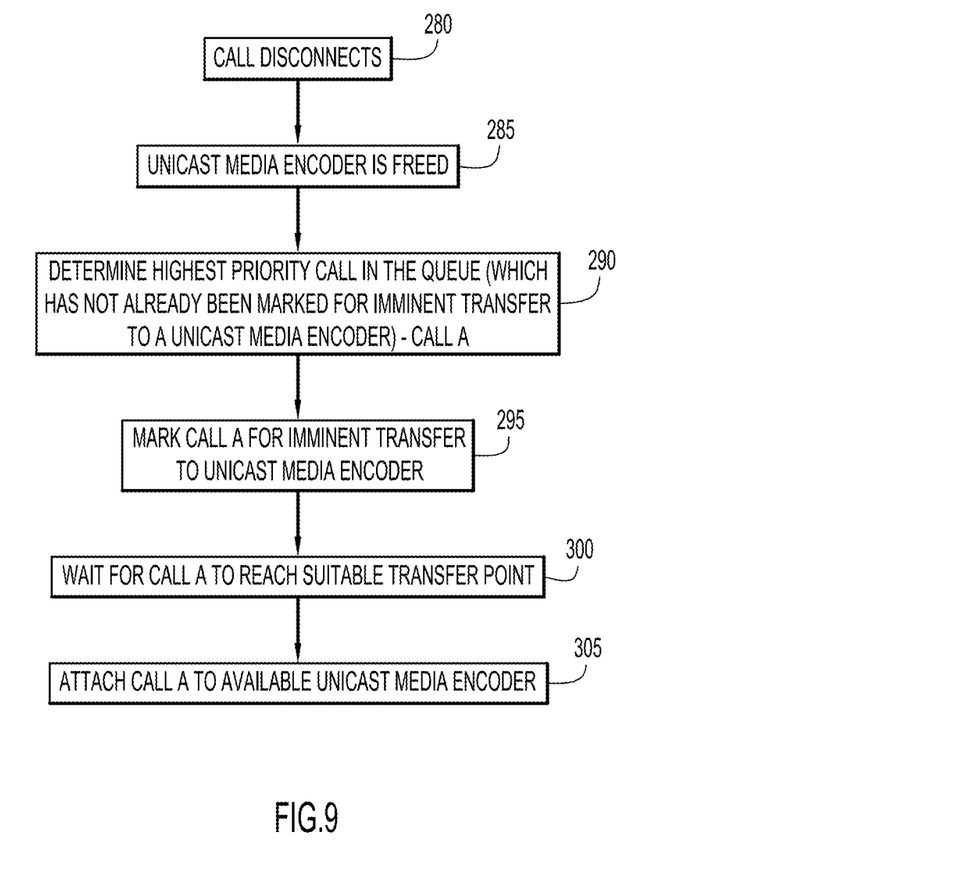
FIG. 9 is a flow chart depicting operations for disconnecting an endpoint from the multicast media encoder and connecting it to a unicast media encoder when a unicast media encoder becomes available.

Reference is now made to FIG. 9 to describe how an endpoint is disconnected from the multicast media encoder. In some applications, it is desirable to connect an endpoint (that has been waiting in the queue) to a unicast media encoder when a unicast media encoder becomes available. At 280, the controller 20 detects when a call disconnects from a unicast media encoder, and at 285, it determines that a unicast media encoder is available. At 290, the controller checks for the calls in the queue 25 and determines the highest priority call (which has not already been marked for imminent transfer to a unicast media encoder) in the queue 25. The highest priority call is referred to as Call A in this description. Thus, rather than use a "first in first out" priority scheme for connecting a call in the queue to a unicast media encoder, some other prioritization may be employed to determine which call/endpoint to take from the queue and connect to the next available unicast media encoder. For example, certain calls/endpoints may have higher priority, based on their position in an organization, and should be allocated use of unicast media encoder resources before other callers/endpoints. At 295, Call A is marked for imminent transfer to a unicast media encoder. At 300, the controller waits for Call A to reach a suitable transfer point, e.g., for completion of the entirety of the multicast media notification (to prevent confusion to the caller). At 305, the controller attaches Call A to the available unicast media encoder.

Thus, FIG. 9 depicts an operational flow by which an endpoint that has been connected to a multicast media encoder is disconnected from the multicast media encoder and connected to one of the plurality of unicast media encoders when it is determined that one of the plurality of unicast media encoders is available. The selection of which endpoint/call in the queue to be connected to the available unicast media encoder may be based on relative priority of the calls in the queue.

The concepts described herein are useful when a single communication session request is received at a time when all unicast media encoders are occupied, and also when a plurality of communication session requests are received at a time when there are insufficient unicast media encoders available to serve all of the communication session requests. For example, there are some situations in which a gateway device would receive an aggregated block of calls. The gateway device may not be capable of answering the incoming requests with a simple alert (ringing) message, and without any other notification or alert, the incoming callers may not know whether the system is operating properly. Thus, the use of a single multicast media encoder to output a multicast media notification (video and/or audio bitstream) can notify the callers that the system is operating normally and that they are being placed in queue for handling. Again, the multicast media notification may be as simple as a message to display and/or announce "Please wait for your call to be connected to an autoattendant." A single encoder can be used to serve a plurality of the queued communication session requests, thereby saving resources in the call control device.

The use of a multicast media encoder (or multiple multicast media encoders for different encoding formats) is useful as a backup to the unicast media encoders. The minimal additional resources associated with the multicast media encoder(s) are useful to notify a caller when the unicast media encoders are unavailable. Moreover, by providing some notification to a queued caller with a multicast media encoder rather than no notification when all the unicast media encoders are busy, the caller is less likely to believe that the system is not operating properly and discontinue the communication session.

As described above, there are also other applications for a multicast media encoder, such as when a plurality of unicast media transcoders are fully occupied, and one or more endpoints should be notified with a multicast media notification to wait until a unicast media transcoder becomes available.

The above description is intended by way of example only.

What is claimed is:

1. A method comprising:
   receiving at a call control device a communication session request from an endpoint;
   determining whether any one of a plurality of unicast media encoders is available for the communication session request;
   when it is determined that none of the plurality of unicast media encoders is available, connecting the endpoint to a multicast media encoder in the call control device, wherein the multicast media encoder is configured to generate a multicast media notification;
   presenting the multicast media notification to the endpoint;
   generating from the multicast media encoder a video keyframe associated with the multicast media notification, and synchronizing the video keyframe to a starting point of an audio portion of the multicast media notification; and
   outputting the synchronized video keyframe from the multicast media encoder.

2. The method of claim 1, further comprising placing the communication session request in a queue for use of one of the plurality of unicast media encoders when it is determined that none of the plurality of unicast media encoders is available.

3. The method of claim 2, further comprising disconnecting the endpoint from the multicast media encoder and connecting the endpoint to one of the plurality of unicast media encoders when it is determined that one of the plurality of unicast media encoders is available.

4. The method of claim 1, wherein receiving comprises receiving a plurality of communication session requests from a plurality of endpoints, determining comprises determining that there are insufficient unicast media encoders available for two or more of the plurality of communication session requests, connecting comprises connecting two or more of the plurality of endpoints to the multicast media encoder, and presenting comprises presenting the multicast media notification to the two or more of the plurality of endpoints.

5. The method of claim 1, wherein receiving comprises receiving a plurality of communication session requests from a plurality of endpoints, determining comprises determining that there are insufficient unicast media encoders available for the plurality of communication session requests, and connecting comprises connecting different subsets of the plurality of endpoints that are configured to operate in accordance with different encoding formats to corresponding ones of a plurality of multicast media encoders, each of which is configured to output media in a different encoding format.

6. The method of claim 1, wherein the outputting includes outputting the video keyframe from the multicast media encoder when it is determined that none of the plurality of unicast media encoders is available.

7. The method of claim 1, wherein the multicast media notification comprises one or more of: an audio bitstream, a still video image frame and a video bitstream comprising a sequence of video frames.

8. The method of claim 1, wherein determining comprises determining whether any of the plurality of unicast encoders are available and capable of outputting media in an encoding format that the endpoint is capable of decoding.

9. An apparatus comprising:
   a network interface unit configured to enable network communications with a plurality of endpoints;
   a plurality of unicast media encoders each configured to output media to an endpoint;
   a multicast media encoder configured to output a multicast media notification to one or more endpoints;
   a controller coupled to the network interface unit, the plurality of unicast media encoders and the multicast media encoder, wherein the controller is configured to:
     determine whether any one of the plurality of unicast media encoders is available upon receiving a communication session request from a particular endpoint;
     when it is determined that none of the plurality of unicast media encoders is available, connect the particular endpoint to the multicast media encoder to present the multicast media notification to the particular endpoint; and
     control the multicast media encoder to output a video keyframe associated with the multicast media notification and synchronized to a starting point of an audio portion of the multicast media notification.

10. The apparatus of claim 9, wherein the controller is configured to place the communication session request from the particular endpoint in a queue for use of one of the plurality of unicast media encoders when it is determined that none of the plurality of unicast media encoders is available.

11. The apparatus of claim 10, wherein the controller is configured to disconnect the particular endpoint from the multicast media encoder and connect the particular endpoint to one of the plurality of unicast media encoders when it is determined that one of the plurality of unicast media encoders is available.

12. The apparatus of claim 9, wherein the controller is configured to process a plurality of communication session requests from a plurality of endpoints, determine that there are insufficient unicast media encoders available for two or more of the communication session requests, and connect two or more of the plurality of endpoints to the multicast media encoder to present the multicast media notification to the two or more of the plurality of endpoints.

13. The apparatus of claim 9, and further comprising a plurality of multicast media encoders each configured to output media according to a corresponding one of a plurality of encoding formats.

14. The apparatus of claim 13, wherein the controller is configured to process a plurality of communication session requests from a plurality of endpoints, determine that there are insufficient unicast media encoders available for the plurality of communication session requests, and connect different subsets of the plurality of endpoints that are configured to operate in accordance with different encoding formats to corresponding ones of the plurality of multicast media encoders.

15. The apparatus of claim 9, wherein the network interface unit is configured to enable Internet Protocol (IP) network communications with a first plurality of endpoints and to enable communications over an Integrated Services Digital Network (ISDN) with a second plurality of endpoints.

16. The apparatus of claim 9, wherein the multicast media encoder is configured to generate the multicast media notification comprising one or more of: an audio bitstream, a still video image frame and a video bitstream comprising a sequence of video frames.

17. The apparatus of claim 9, wherein the plurality of unicast media encoders are transcoders configured to convert media associated with a communication session from one encoding format to another encoding format.

18. One or more non-transitory computer readable storage media encoded with software comprising computer executable instructions and when the software is executed operable to:
    determine whether any one of a plurality of unicast media encoders is available for a communication session request received at a call control device from an endpoint;
    when it is determined that none of the plurality of unicast media encoders is available, connect the endpoint to a multicast media encoder in the call control device, the multicast media encoder being configured to generate a multicast media notification for presentation to the endpoint; and
    output from the multicast media encoder a video keyframe associated with the multicast media notification synchronized with a starting point of an audio portion of the multicast media notification.

19. The computer readable storage media of claim 18, wherein the instructions operable to determine comprises instructions operable to determine that there are insufficient unicast media encoders available for two or more of a plurality of communication session requests received at the call control device, and the instructions operable to connect comprise instructions operable to connect connecting two or more of the plurality of endpoints to the multicast media encoder.

20. The computer readable storage media of claim 18, wherein the instructions operable to determine comprise instructions operable to determine that there are insufficient unicast media encoders available for a plurality of a plurality of communication session requests from a plurality of endpoints, and the instructions operable to connect comprise instructions operable to connect different subsets of the plurality of endpoints that are configured to operate in accordance with different encoding formats to corresponding ones of a plurality of multicast media encoders, each of which is configured to output media in a different encoding format.

* * * * *